W. R. MOTT.
PROCESS OF MANUFACTURING LAMPBLACK.
APPLICATION FILED JUNE 24, 1916.
1,259,121. Patented Mar. 12, 1918.
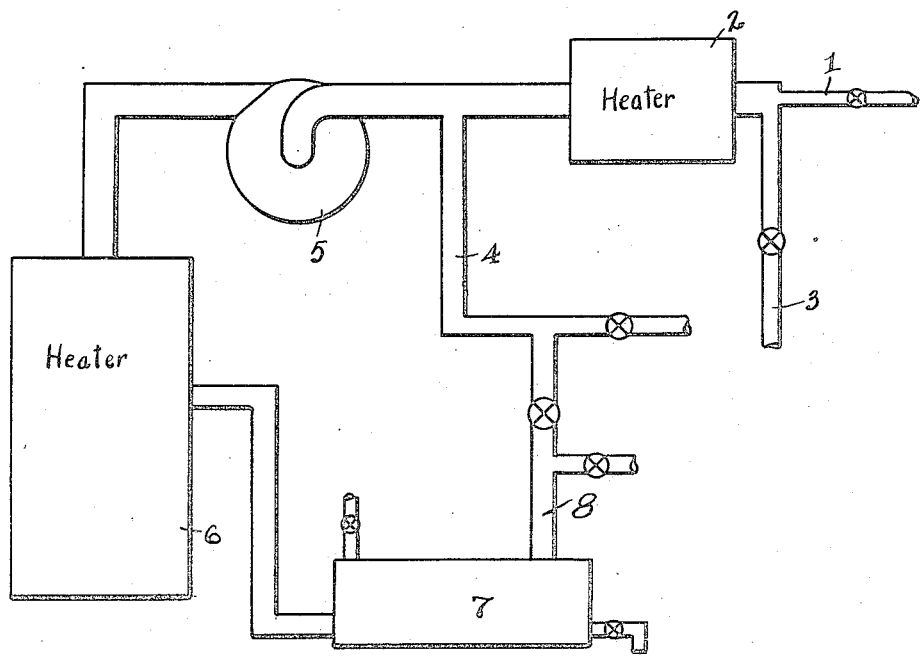
INVENTOR.
WILLIAM R. MOTT
BY
ATTORNEY

UNITED STATES PATENT OFFICE.

WILLIAM ROY MOTT, OF LAKEWOOD, OHIO, ASSIGNOR, BY MESNE ASSIGNMENTS, TO NATIONAL CARBON COMPANY, INC., A CORPORATION OF NEW YORK.

PROCESS OF MANUFACTURING LAMPBLACK.

1,259,121.      Specification of Letters Patent.     Patented Mar. 12, 1918.

Application filed June 24, 1916. Serial No. 105,685.

*To all whom it may concern:*

Be it known that I, WILLIAM R. MOTT, a citizen of the United States, residing at Lakewood, in the county of Cuyahoga and State of Ohio, have invented a certain new and useful Improvement in Processes of Manufacturing Lampblack, of which the following is a full, clear, and exact description.

This invention relates to the formation and purification of lampblack.

There are a number of processes of manufacturing lampblack or soot, a common one being to heat natural gas, which is chiefly methane ($CH_4$) to cause the deposition of the carbon therein. A very high temperature, about 1400°, is required to decompose natural gas and the carbon or lampblack is chiefly deposited as a scale on the heated surfaces. It is hard in texture and is unsuitable for a number of purposes to which lampblack is put. The chief disadvantage, however, of present processes of treating natural gas, is their extreme inefficiency. In fact, only a small per cent. of the available carbon is deposited as lampblack.

My invention aims to overcome the above disadvantages, and relates to the treatment of natural gas for the production of a very soft and fine lampblack at only moderately high temperatures. I have found that when carbon tetrachlorid is mixed with methane and heated to a moderate temperature, a copious precipitate of lampblack is produced. This precipitate is not confined to hot surfaces as in the usual lampblack process, but occurs throughout the entire body of the gases. The reaction takes place in accordance with the following equation:

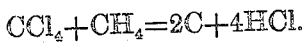

It will thus be seen that a high percentage of carbon will be obtained from the treatment, as the reaction is substantially complete. Another important advantage of the process is the formation of hydrochloric acid as a by-product. This hydrochloric acid will be substantially free from sulfur and arsenic compounds and will therefore be of great purity.

I am not prepared to specify the exact temperature necessary to cause carbon tetrachlorid to react with the methane of natural gas, but it is lower than that required for the formation of lampblack by heat alone, from either of the constituents, and it is below the softening point of hard glass tubing which I have used in my experiment for the production of lampblack.

While the carbon tetrachlorid can be obtained in any manner, I prefer to produce it by reacting on natural gas with chlorin. When sufficient chlorin is heated with natural gas, the following reaction takes place, an excess of chlorin being preferably used:

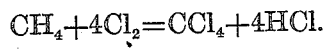

The apparatus for the manufacture of lampblack is diagrammatically shown on the single figure of the drawing. Chlorin will be admitted through pipe 1 to the heater 2 where it will meet and react with the methane of the natural gas entering through pipe 3. Carbon tetrachlorid and hydrochloric acid will be formed in accordance with the equation mentioned previously, and these will meet a stream of natural gas proceeding through pipe 4. The mixture of hydrochloric acid, natural gas and carbon tetrachlorid, will be mixed together properly by some means such as a rotary fan 5, and forced into the heater 6 where reaction between the carbon tetrachlorid and the methane of the natural gas will take place. The gaseous materials will then be forced from the heater 6 through a condenser or separator 7 where the hydrochloric acid will be separated by solution in water from the other gaseous constituents, which are chiefly undecomposed natural gas. This excess of natural gas will pass through pipe 8 into the pipe 4 and will again be circulated through the system. Sufficient addition of natural gas from the mains will be admitted to keep up the proper working of the system.

Outside of the high priced metals, the best material that is available for the heaters 2 and 6 is probably carbon which is cheap and easy to make into the proper apparatus. The walls of the heaters or furnaces can be made of iron or firebrick lined with carbon properly luted or cemented to prevent the chlorin or carbon tetrachlorid from reaching the outer shell of the furnace. The heat necessary for the reaction in furnace 6 and drum 2 can be obtained in any way, but electric heat, such as the heat from the electric arc, would be especially advantageous in heater 6, while gas could be used in connection with heater 2.

Another aspect of my invention is the purification of lampblack and articles made therefrom, as well as from other kinds of carbon. Lampblack when produced by certain known processes, has too high a percentage of impurities to be used directly in certain arts, particularly in the manufacture of printing ink and in the arc lamp industry. The most common impurities are the oxids of iron and silica, and to free lampblack of these and other substances, I propose to heat it with carbon tetrachlorid or with chlorin and natural gas, which will produce carbon tetrachlorid.

As a specific application of the invention, I will describe it in connection with the calcination of lampblack to be used in the carbon industry, such as in the making of arc lamp electrodes, brushes for dynamo electric machines, etc. For the manufacture of these articles it is generally the practice to mix pitch or tar with lampblack and compact it into cakes which are then calcined to 800° to 1000° C. to drive off the volatile constituents. To adapt the invention to this procedure, I would mix carbon tetrachlorid with the lampblack, either with or without pitch, tar or other binding material, and when the cakes are calcined the carbon tetrachlorid will react with the impurities in the lampblack, such as the oxids of silicon, iron, etc., in accordance with the following equations:—

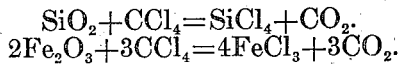

$$SiO_2 + CCl_4 = SiCl_4 + CO_2.$$
$$2Fe_2O_3 + 3CCl_4 = 4FeCl_3 + 3CO_2.$$

The carbon tetrachlorid reacts on the oxids mentioned to produce the chlorids of the respective metals which at the temperature of calcination of the lampblack would be driven off to escape through the furnace flue.

Instead of mixing carbon tetrachlorid with the lampblack in liquid form, it may be passed into the calcining furnace in a vapor form where the reaction would proceed in a similar way.

Also chlorin and natural gas may be mixed together and passed into the calcining chamber where the heat would cause the interaction for the production of carbon tetrachlorid and hydrochloric acid, as previously set forth herein. The carbon tetrachlorid would then act on the impurities and the hydrochloric acid formed would coöperate in this respect, particularly as regards the iron oxid. This reaction would be as follows:—

$$Fe_2O_3 + 6HCl = 2FeCl_3 + 3H_2O.$$

It will thus be seen that the combination of chlorin and natural gas makes an especially suitable reagent for the purpose mentioned.

My process of the purification of carbon is not limited to lampblack in its application, as any carbon or graphite can be purified by the same process. It is well known that various cokes used in the carbon industry and other arts possess a more or less high percentage of impurities, such as oxids and compounds of silicon, iron, manganese, etc. The coke or other carbon product can be treated in the calcining furnaces in the same way as has just been described.

The invention is also applicable to the purification of carbon articles that have been formed into the desired shape, such as arc lamp electrodes, brushes for dynamo electric machines, switch contacts, etc. The carbon tetrachlorid could be mixed with the binder that is used to hold the particles together, or it may be introduced in gaseous or vapor form into the furnace to react on the impurities in the formed article by passing directly into the pores thereof.

The carbon articles can also be baked in a furnace in an atmosphere of natural gas and chlorin. The carbon tetrachlorid would react with the impurities and the natural gas would at the same time react with the latter to deposit carbon in the pores of the carbon article. In this way the article would be purified and made more dense by the deposit of pure carbon in the pores and voids.

Having described my invention, what I claim is:—

1. The process of making lampblack which consists in heating a mixture of methane gas and carbon tetrachlorid.

2. The process of forming lampblack which consists in heating chlorin and methane to form carbon tetrachlorid and then heating the carbon tetrachlorid and further quantities of methane to produce a precipitation of carbon.

3. The process of making lampblack which consists in admitting chlorin and natural gas to a heater to form carbon tetrachlorid and hydrochloric acid, then mixing the resulting products with a further amount of natural gas, forcing the same into a heater to form therefrom lampblack and hydrochloric acid, withdrawing the hydrochloric acid and excess of natural gas through a condenser for the hydrochloric acid and then passing the excess of natural gas into the stream of additional natural gas entering the said mixer.

In testimony whereof, I hereunto affix my signature.

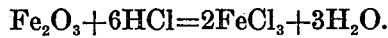

WILLIAM ROY MOTT.